Dec. 10, 1957 G. PAPITTO 2,816,259

REMOTE CONTROL CHANNEL SELECTOR FOR TELEVISION RECEIVERS AND THE LIKE

Filed Oct. 29, 1953 3 Sheets-Sheet 1

INVENTOR.
Gene Papitto.
BY Robert H Wendt
Attorney.

Dec. 10, 1957 G. PAPITTO 2,816,259

REMOTE CONTROL CHANNEL SELECTOR FOR TELEVISION RECEIVERS AND THE LIKE

Filed Oct. 29, 1953

3 Sheets-Sheet 2

INVENTOR.

Gene Papitto.

BY Robert H. Wendt

Attorney.

INVENTOR.
Gene Papitto
BY Robert H. Wendt
Attorney

United States Patent Office 2,816,259
Patented Dec. 10, 1957

2,816,259

REMOTE CONTROL CHANNEL SELECTOR FOR TELEVISION RECEIVERS AND THE LIKE

Gene Papitto, Chicago Heights, Ill.

Application October 29, 1953, Serial No. 389,120
1 Claim. (Cl. 318—467)

The present invention relates to a remote control channel selector for television receivers and the like, and is particularly concerned with the provision of an improved method and apparatus whereby the observers of television receivers may change channels without leaving their chairs, and any channel is immediately available to the user by means of this remote control mechanism.

One of the objects of the invention is the provision of an improved remote control method and apparatus which is simple in construction, capable of economical manufacture, positive in its action, sturdy, accurate, and adapted to be used for a long period of time without necessity for repair or replacement of any of its parts.

Another object of the invention is the provision of a remote control mechanism which is adapted to be used with any television receiver having a channel selector shaft that rotates constantly in the same direction.

Another object of the invention is the provision of an improved control mechanism which holds the channel selector shaft in the selected position when it has reached that channel.

Another object of the invention is the provision of an improved controlling mechanism requiring only the pushing of a button to select a corresponding television channel, all of the other buttons immediately being released and the mechanism automatically moving the channel selector shaft to the required position.

Another object of the invention is the provision of an improved remote controlled selection system and apparatus which not only controls the selection of any channel desired but also controls the energization of the radio receiver once the wall plug of the receiver has been connected to this apparatus, so that the user may turn the entire receiver on or off by manipulating the push buttons.

Other objects and advantages of the invention will be apparent from the following description and the accompanying drawings, in which similar characters of reference indicate similar parts throughout the several views.

Referring to the two sheets of drawings accompanying this specification,

Figures 1, 2, 5, 6:
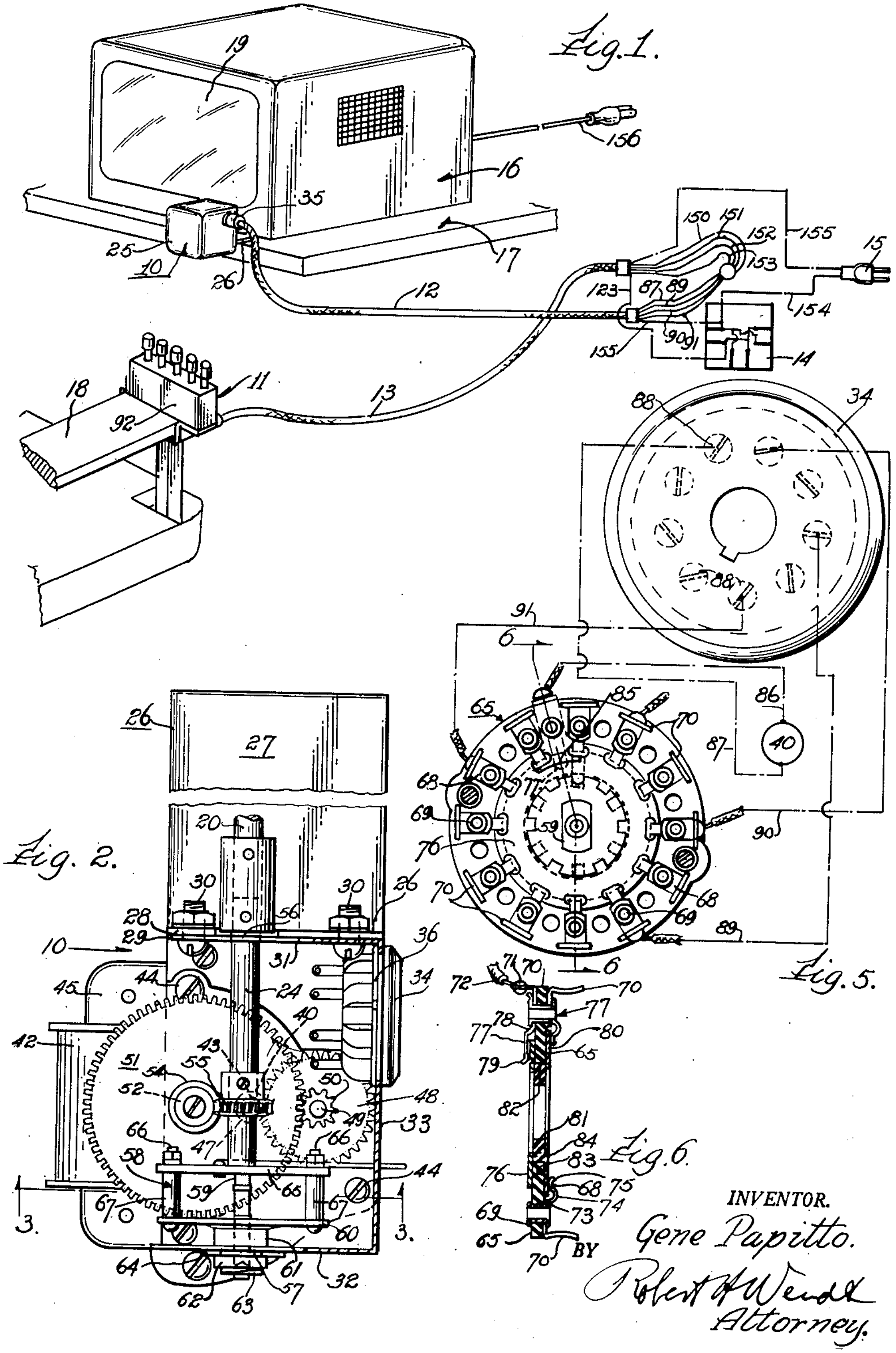
Fig. 1 is a view in perspective showing the application of my channel selector to a television receiver, and showing the location of the controlling push-buttons on the arm of a chair.
Fig. 2 is a top plan view of the motor unit.
Fig. 5 is a fragmentary diagrammatic view showing the fixed contacts of the motor driven switching unit and the corresponding connecting conductors.
Fig. 6 is a sectional view taken on the plane of the line 6—6 of Fig. 5.

Referring to Fig. 1, the present apparatus preferably includes a motor driven switching unit 10, a push-button switching unit 11, connecting cables 12 and 13, a female connector 14, and a male connector 15 for insertion into a wall socket.

A suitable television receiver is indicated at 16. The television receiver 16 may be located upon a table or other stand 17, at a distance from the push-button switching unit 11, which is shown resting on the arm 18 of an armchair occupied by a person viewing the screen 19 of the receiver.

Figures 3, 4, 7, 8, 9:
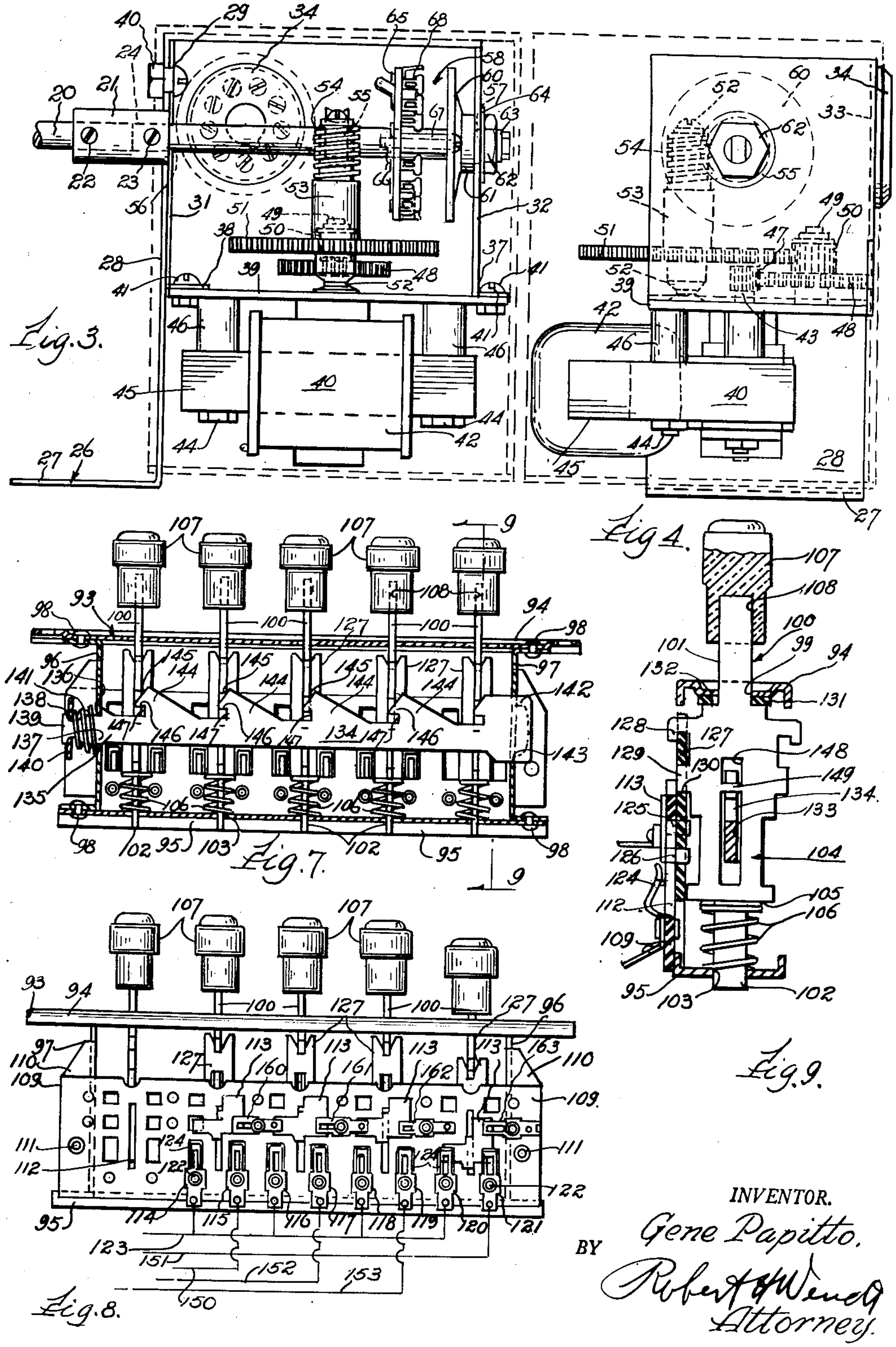
Fig. 3 is a side elevational view of the motor unit.
Fig. 4 is an end elevational view of the motor unit.
Fig. 7 is a side elevational view of the push-button switching unit with its housing removed.
Fig. 8 is a side elevational view of the push-button switching unit taken from the opposite side.
Fig. 9 is a sectional view taken on the plane of the line 9—9 of Fig. 7, looking in the direction of the arrows.
Figure 10:
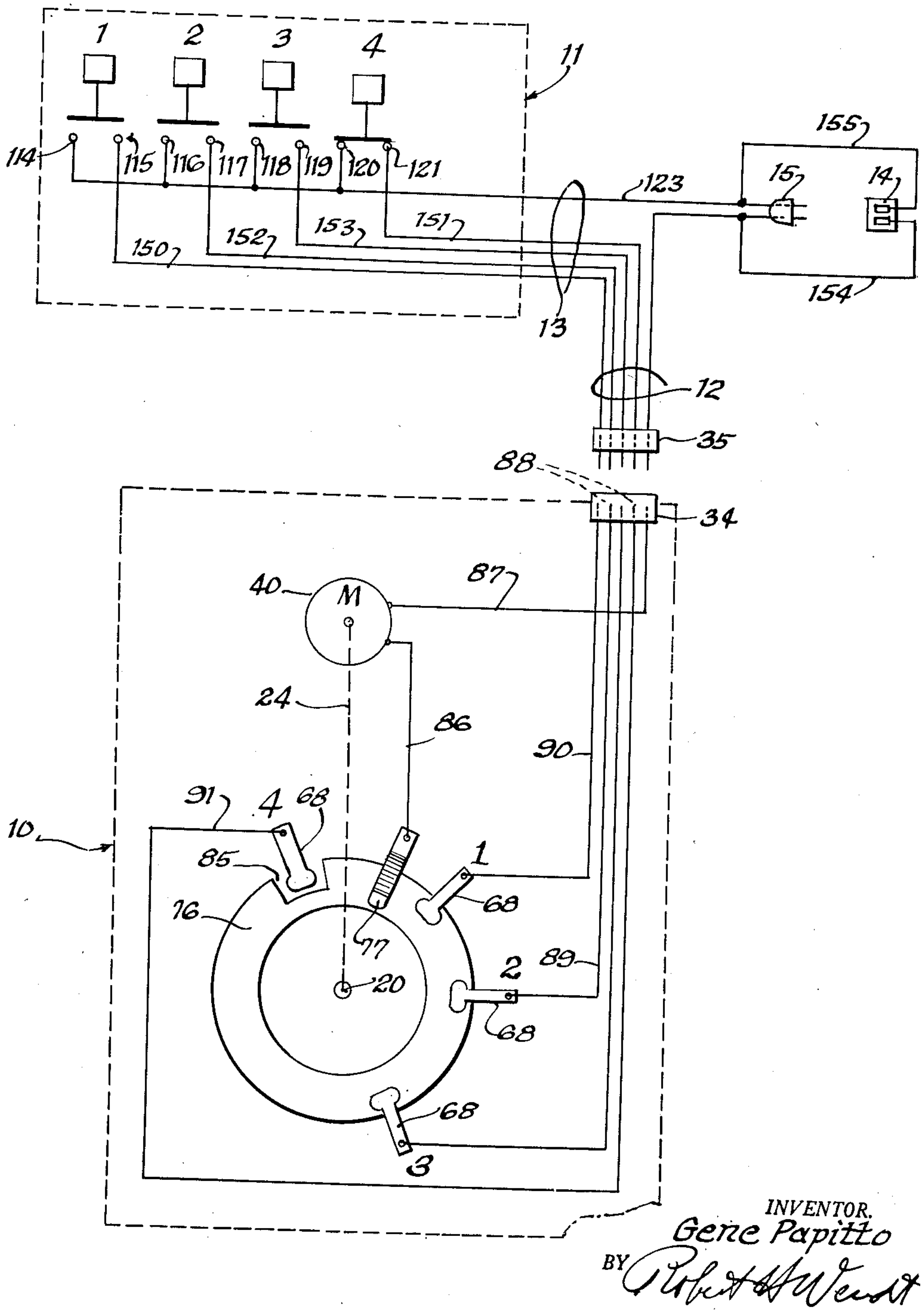
Fig. 10 is a wiring diagram of the circuit employed in my channel selector.

The receiver is provided with the usual channel selector shaft 20, Fig. 3, the knob of which has been removed and the end of which has been inserted in a tubular coupling 21, having a pair of set screws 22, 23, for providing a driving connection between the channel selector shaft 20 and the driven shaft 24 of the motor driven switching unit 10.

The television receiver 16 has its channel selector shaft 20 provided with the usual indexer (not shown) for holding the channel selector shaft in proper position for any selected channel.

Both the motor driven switching unit 10 and the push-button switching unit 11 may be housed in suitable rectangular housings made of wood, plastic, or metal matching the furniture or housing of the television receiver.

The housing for the motor driven switching unit 10 is indicated at 25. This unit is shown in Figs. 2 to 6, and it is mounted on the television receiver by means of a sheet metal angle bracket 26, having a horizontal flange 27, which is secured to the bottom of the receiver, and a vertical flange 28, which is secured to the unit frame 29 by screw bolts 30 passing through slots so that the vertical elevation of the unit relative to the bracket may be adjusted to fit the elevation of the channel shaft 20.

The motor driven switching unit 10 preferably includes a sheet metal frame 29, having a pair of vertical flanges 31, 32, joined by a third vertical flange 33, Fig. 4.

The vertical flange 33 is used to support a multiple prong connector socket 34, having an aperture and contacts for each of the prongs of a multiple prong connector 35 connected to the cable 12 and to the conductors therein.

Connector 34 passes through an aperture and is secured in place by means of a spring washer 36. The other vertical flanges 31 and 32 are provided with horizontally extending integral flanges 37, 38, which are used for mounting the base plate 39 of an electric motor 40 by means of a plurality of screw bolts 41.

The electric motor 40 may be of any standard type adapted to be driven by 110 volt, 60 cycle alternating current, and its winding is indicated at 42, while its drive shaft is indicated at 43.

The motor is secured to the base plate 39 by a plurality of screw bolts 44 passing through the field core 45 and provided with tubular spacers 46.

The motor shaft preferably carries a pinion 47 at its upper end meshing with a fiber spur gear 48, rotatably mounted upon shaft 49 and attached to a second pinion 50. The pinion 50 drives a larger spur gear 51, mounted upon shaft 52, and fixedly secured by means of an elongated hub 53 to a worm 54.

The worm 54 meshes with a worm gear 55, Fig. 2, which is mounted upon the driven shaft 24, driving the driven shaft 24, at a suitable reduced speed from the motor shaft.

The speed reducing gearing between motor shaft 43 and driven shaft 24 includes the worm gear and worm which is an irreversible mechanism adapted to hold the channel selector shaft in any position to which it is moved.

The two vertical flanges 31 and 32 of the motor switching unit frame 29 are provided with aligned apertures 56 and 57, the first of which is to pass the shaft 24 and serve as a bearing, and the second of which is to provide a support for a rotary switch unit 58.

Shaft 24 carries the worm gear 25 and passes the rotary switch unit 58, and has a flattened end 59 by means of which it drives the rotary switch unit 58. The rotary switch unit 58 comprises an insulating plate 60 which is secured centrally to a hub 61 that passes through aperture 57 and is secured in place by nut 62 on its threaded end 63.

A lock washer 64 is used with nut 62. The hub 61 is hollow, having a bore acting as a bearing for the flattened end portion 59 of shaft 24, the round portions of which act as a trunnion.

Insulating plate 60 of the rotary switch 58 carries a second insulating plate 65 by means of a plurality of screw bolts and nuts 66 and tubular spacers 67. The insulating disc 65 carries a multiplicity of fixed contacts 68, arranged in a circle and secured to the disc by rivets 69.

Each contact 68 has an attaching flange 70 for the rivet and a connector flange 71 extending at right angles and having an aperture for the reception of a conductor 72, which is soldered to it.

Each contact 68 has an offset at 73 and a parallel portion 74, which is spaced from the disc 65 and ends in a curved contact portion 75. The portion 74 gives the contact resilience and holds it in engagement with an annular movable contact 76.

One of the rivets also supports a common contact 77, having a curved, resilient portion 78 and a contact nib 79 for engaging a common annular contact plate 80, located on the right side of the insulating disc 65, Fig. 6.

The two annular contact plates 76 and 80 are riveted at multiple points to a rotating insulating annulus 81, which is located in a bore 82 in the disc 65. The two plates 76 and 80, with the insulating annulus 81 form a groove 83 for slidably engaging inside the bore 82 of the insulating disc 65, so that the plates 76 and 80 rotate together on the insulating disc 65.

The two plates are electrically connected by transverse riveting formations 84 and are always in contact in electrical conductor relation to the common contact 77.

The annular contact 76 engages all of the fixed contacts 68, but one which corresponds to the channel selected and the annular contact disc 76 misses this one contact because it has a cut-out portion 85 which is deep enough radially to miss all the contacts 68, and which is wide enough peripherally so that one of the contacts is not engaged by the plate 76 but those on both sides of it are engaged.

The cable 12 also includes one of the conductors 155 leading to wall plug 15.

The motor driven switching unit is shown as having a multiplicity of contacts although at the present time only six of them may be used for six different channels.

The common contact 77 is connected by one conductor 86 to one of the terminals of the motor 40. The other terminal is connected by conductor 87 to one of the contacts 88 of the multiple contact plug.

All of the other fixed contacts 68 which are being utilized are connected by suitable conductors 89, 90, 91 to contacts 88 of the multiple contact plug 34. Thus the motor is adapted to be connected to the external circuit to be energized through the multiple contact socket 34 and plug 35, and cable 12 which contains all of the conductors 87, 89, 91, and others if additional contacts are used for energizing the motor through the rotary switch unit 58, whenever the circuit is closed through the common contact 77 and the plate 76 and one of the fixed contacts 68.

The push-button switching unit 11 is enclosed in a suitable housing 92, the upper wall of which covers and supports the push-button switch frame 93, Fig. 7. This push-button switch frame includes an upper frame member 94, a lower frame member 95 and two end frame members 96 and 97 secured together by rivets 98 in rectangular shape.

The upper frame member 94 has a plurality of slots 99 for slidably supporting the push-button supporting members 100. Each push-button supporting member 100 has a reduced elongated guide flange 101 at its upper end and another such flange 102 at its lower end.

The lower guide flange 102 in each case passes through a slot 103 in the lower frame member 95. The upper and lower frame members and side frame members 93—96 are all channeled for increased strength.

All of the push-button supporting members 100 have a wider central body 104 which provides a pair of shoulders at 105 engaging one end of a helical coil spring 106 on each of the lower guide flanges 102. The other end of each coil spring engages the bottom frame member 95, urging all of the push-button supporting members 100 upward.

Any number of push-button supporting members may be provided by merely making the switch longer, dependent on the number of channels controlled, and the springs 106 tend to move the push-buttons to the open position.

Each push-button supporting member 100 supports a molded selector push-button 107 at the upper end on the guide member 101, which has a frictional fit in a rectangular aperture 108 in the push-button 107.

One side of the push-button switch frame 93 supports an insulating fiber plate 109, which is riveted to the reinforcing flanges 110 of the end frame units 96 and 97 by rivets 111. The insulating plate 109 is provided with a vertical slot 112 for each push-button for the purpose of slidably supporting a sliding contact 113.

The insulating plate 109 supports a multiplicity of fixed contacts 114—121, similar to those previously described, each of which is secured with a tubular rivet 122.

The insulating plate 109 also supports a plurality of fixed contacts 160—163, riveted to it and connected to a common conductor 155 leading to wall plug 15.

Each of the fixed contacts has the usual connector and half of these contacts, to wit, Nos. 114, 116, 118 and 120, act as a common contact, all being connected to the conductor 123. The other contacts 115, 117, 119 and 121 act as channel selector contacts.

Each fixed contact 114—121 has an upwardly extending resilient contact finger 124, Fig. 9, to be engaged by the movable contact 113 of its corresponding push-button. The movable contact 113 has a pair of inwardly extending tabs 125, 126, Fig. 9, passing through the slot 112 in each case and clamped to an insulating plate 127, which has apertures to receive the tabs 125, 126.

The insulating plate 127 is mounted upon the push-button body 104 by engaging under a hook 128 at the top and by having an integral tongue 129 project through an aperture 130 in each plate 127.

Thus the sliding push-button member 100 is adapted to cause the insulating plate 127 to slide, carrying with it the contact 113 which bridges two of the contacts 114—121.

Movable contact 113 also engages one of contacts 160—163, closing the circuit to the source of energization or opening it. The female connector 14 has its prong sockets connected to line conductors 154, 155, and is adapted to receive the wall plug 156 of the television receiver. This enables control of the energization of the receiver by any push-button.

The push-button guide 101 carries a square fiber washer 131 below the top frame member 94, and having an aperture fitting the guide 101 against shoulder 132. The plungers are all provided with a through rectangular aperture 133 for receiving a longitudinally extending latching member 134, Fig. 7.

The latching member 134 comprises an elongated strip of metal having an end portion 135 of reduced size and provided with a shoulder 136, limiting its movement to the left by engaging the end frame member 96.

The portion 135 of each latching member passes through a complementary aperture 137 in the end frame member and is formed with a groove 138 and a head 139 for engaging a spring retainer 140.

The spring retainer 140 engages one end of a coil spring 141, the other end engaging outside the end frame member 96 and tending to draw the latching member 134 toward the left. At its right end the latching member 134 has an integral extension 142 sliding in a complementary rectangular aperture 143 in the end frame member 97.

Adjacent each push-button member 100 and located near its wider body portion 104 the latching member 134 has an upwardly extending triangular portion 144 which has a beveled surface 145 and a shoulder 146 which faces downwardly above a groove 147.

The push-button bodies are all provided with another rectangular aperture 148 located above the rectangular aperture 133 and separated from it by a narrow partition 149. The narrow partition 149 serves as a latching shoulder engaging below the shoulder 146 on the latching member whenever a push-button is pushed down.

The beveled surface 145 acts as a camming surface against the partition 149 and when a push-button is pushed down the partition 149 cams against the beveled portion 145 of the latching member and forces the latching member to the right, in Fig. 7. The latching member is spring pressed toward the left and tends to move back into latching position.

The operation of the push-button switch unit is as follows:

Assuming all the push-buttons are up in the open position of Fig. 9 and Fig. 7, if a push-button is pushed it slides downward against its spring 106 and its partition 149 cams against the beveled surface 145, and moves the latching member 134 toward the right against spring 141.

When the partition 149 passes the point above the shoulder 146, the partition 149 then moves down below the shoulder 146 and the spring 141 moves the latching member 134 toward the left, holding that push-button down by the fact that the partition 149 is under the shoulder 146.

The push-button thus remains latched until it is unlatched as follows:

When another push-button is pushed down its partition 149 engages a camming surface 145 and moves the latching member 134 toward the right until the former push-button, which is also latched, becomes unlatched and is moved upward by its spring 106.

If the button being pushed is pushed to the end of its stroke it becomes latched, but if not it may rise again before becoming latched. Thus any of the push-buttons may be latched in closed position by pushing on them, but only one push-button can be closed at any time because the pushing of a second button will always unlatch the one that is latched.

The push-buttons bear the numbers of the channels of the television receiver and each of their individual contacts 115, 117, 119 and 121 has an individual conductor in the cable 13.

In addition there is the common conductor 123 in the cable 13. All of the individual conductors 150, 151, 152 and 153 of cable 13 are directed into the cable 12 and extend into the plug 35, where they are connected with prongs that lead to the individual contacts 68, representing the different channels.

The other conductor 123 leading from the common contacts of the push-button switch 11, through cable 13, extends into the female connector 14, where it is connected to one side of each of the prong sockets.

The return conductor from the motor driven switch unit 10, which is connected to the common contact 77 and indicated at 86, leads first to the motor 40, and conductor 87 from the motor is in the cable 12.

The conductor 87 extends into the female connector 14, where it is connected to one of the conductors 154, leading to the wall plug 15. The other conductor 155, from the wall plug 15, extends into the cable 13 with the following result:

The female plug 14 may be used for energizing the television receiver by connection with its usual wall plug 156. This places the energization of the receiver under the control of the push-button unit because the two conductors 154 and 155 cannot energize the female plug 14 until a push-button is closed, closing a circuit to the common conductor 150.

When a push-button is closed a circuit is closed from the wall plug through the corresponding push-button contacts by means of common conductors 150, and cable 13; and the same circuit is also closed through the common contact 77 of the rotary switch on the motor switch unit 10 and the corresponding channel selector contact 68 of the rotary switch, the circuit returning through the common conductor 87.

This causes the motor to operate and turn the shaft 24, which turns the channel selector shaft 20, until the cutout 85 arrives opposite the rotary switch contact 68, which corresponds to the channel selected. Then the circuit is broken at contact 68 and cutout 85 and the motor stops running, and the channel selector shaft 20 stops, having been moved to the channel selected.

The receiver 16 is, of course, in parallel with the controlling circuits, assuming that the usual "On"—"Off" switch of the receiver has been turned on.

When it is desired to select another channel it is only necessary to push the corresponding push-button which will unlatch the push-button which is then in contact and will latch the new push-button in closed position, resulting in the turning of the channel selector shaft until it reaches the selected channel position.

Besides controlling the selection of any desired channel, the present push-button unit and motor driven switch are adapted to control the energization of the receiver or the deenergization through the use of the auxiliary female connector 14. When the usual wall plug of the television receiver is connected to this female connector, the receiver is entirely under the control of the present remote control system.

It will thus be observed that by means of my remote control apparatus and method the user of the television receiver may sit in his customary chair in position to view the screen of the receiver, and by manipulating the push-buttons he may select any channel he desires and change the channels as often as he desires.

It is no longer necessary to view those portions of the program which become uninteresting as a new channel may be selected without the user rising from his chair and going over to the television receiver to turn the channel selector knob.

While I have illustrated a preferred embodiment of my invention, many modifications may be made without departing from the spirit of the invention, and I do not wish to be limited to the precise details of construction set forth, but desire to avail myself of all changes within the scope of the appended claim.

Having thus described my invention, what I claim as new and desire to secure by Letters Patent of the United States, is:

A remote control channel selector switch assembly for television receivers, comprising a channel selector shaft having an indexer for releasably holding the shaft in any of a plurality of channel positions, a rotary motor having a drive shaft, speed reducing gearing between said drive shaft and said channel selector shaft for driving the latter at a low rate of speed and supplying sufficient power to overcome said releasable indexer to move said channel selector shaft from one position to another, a motor controlling switch, comprising a fixed insulating ring having a circular aperture and a multiplicity of fixed contacts carried by one side of said ring and projecting radially inward over said circular aperture, a second insulating plate secured to said channel selector shaft to rotate with the shaft, and located in the aperture of said ring, said second insulating plate being provided on both of its sides with annular contact plates fixedly secured thereto by through securing members, placing them in electrical conducting relation, said annular contact plates projecting outwardly and radially from said second insulating plate, and forming an annular groove slidably engaging the first-mentioned insulating plate on both sides of said aperture, one of said annular contact plates extending to a point between the first-mentioned insulating ring and its multiple fixed contacts, each of the multiple fixed contacts being riveted to said insulating ring, and having an outwardly and inwardly curved resilient portion and a contacting nib for engaging the adjacent contact ring, a motor controlling contact carried by the other side of said fixed insulating ring opposite to the multiple contacts, and extending inwardly to engage the contact ring on that side, the said latter contact ring being provided with a cut-out portion at its periphery, the said cut-out portion exposing a portion of the insulation of said first-mentioned insulating ring, and engaging said insulation instead of the annular contact ring when the latter contact is in position to be received in said cut out, and cutting out the motor when the rotating contact plate reaches that point, a second motor contact carried by said first insulating ring, and extending into engagement with one of the annular contact plates, and continuously engaged thereby, being located to extend inwardly of said cutout portion to engage a continuous portion of the contact plate having said cut-out, said multiplicity of contacts also being connected in the motor circuit for selective closure of the motor circuit to cause rotation of the switch until the motor controlling contact arrives in said cut-out at the channel selected, causing stoppage of the motor at that position.

References Cited in the file of this patent

UNITED STATES PATENTS

| | | |
|---|---|---|
| 1,971,130 | Chubb | Aug. 21, 1934 |
| 2,213,845 | Mastney et al. | Sept. 3, 1940 |
| 2,234,405 | Hall et al. | Mar. 11, 1941 |
| 2,263,989 | Hill et al. | Nov. 25, 1941 |
| 2,297,819 | Wagenknecht | Oct. 6, 1942 |
| 2,362,690 | Fichter et al. | Nov. 14, 1944 |